(12) United States Patent
Soryal et al.

(10) Patent No.: US 11,102,329 B2
(45) Date of Patent: Aug. 24, 2021

(54) MINIATURIZED NETWORK NODES

(71) Applicant: AT&T Intellectual Property I, L.P., Atlanta, GA (US)

(72) Inventors: Joseph Soryal, Ridgewood, NY (US); Daniel Yaniro, Jr., Freehold, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 84 days.

(21) Appl. No.: 16/702,888

(22) Filed: Dec. 4, 2019

(65) Prior Publication Data

US 2020/0374368 A1    Nov. 26, 2020

Related U.S. Application Data

(63) Continuation of application No. 16/416,680, filed on May 20, 2019.

(51) Int. Cl.
*H04L 29/08* (2006.01)
*H04L 12/26* (2006.01)
*H04L 29/06* (2006.01)

(52) U.S. Cl.
CPC ........ *H04L 67/327* (2013.01); *H04L 43/0811* (2013.01); *H04L 43/0817* (2013.01); *H04L 63/08* (2013.01); *H04L 67/1095* (2013.01)

(58) Field of Classification Search
None
See application file for complete search history.

(56) References Cited

U.S. PATENT DOCUMENTS

| | | | |
|---|---|---|---|
| 2018/0034714 A1* | 2/2018 | Zhang | H04L 41/0806 |
| 2018/0234308 A1* | 8/2018 | Bruun | H04L 41/5054 |
| 2018/0262431 A1* | 9/2018 | Zhang | H04L 47/125 |
| 2020/0067800 A1* | 2/2020 | Wang | H04L 41/5051 |

* cited by examiner

*Primary Examiner* — Jeffrey R Swearingen
(74) *Attorney, Agent, or Firm* — BakerHostetler

(57) ABSTRACT

A method includes identifying a first validation parameter of a first network node and a second validation parameter of a second network node. The method includes creating an authentication node based on the first and second validation parameters. The method also includes receiving a request to access a microservice that utilizes the first network node and the second network node. The authentication node analyzes the request to make a validation determination indicative of whether the request satisfies the first and second validation parameters and controls access to the microservice based on the validation determination.

20 Claims, 4 Drawing Sheets

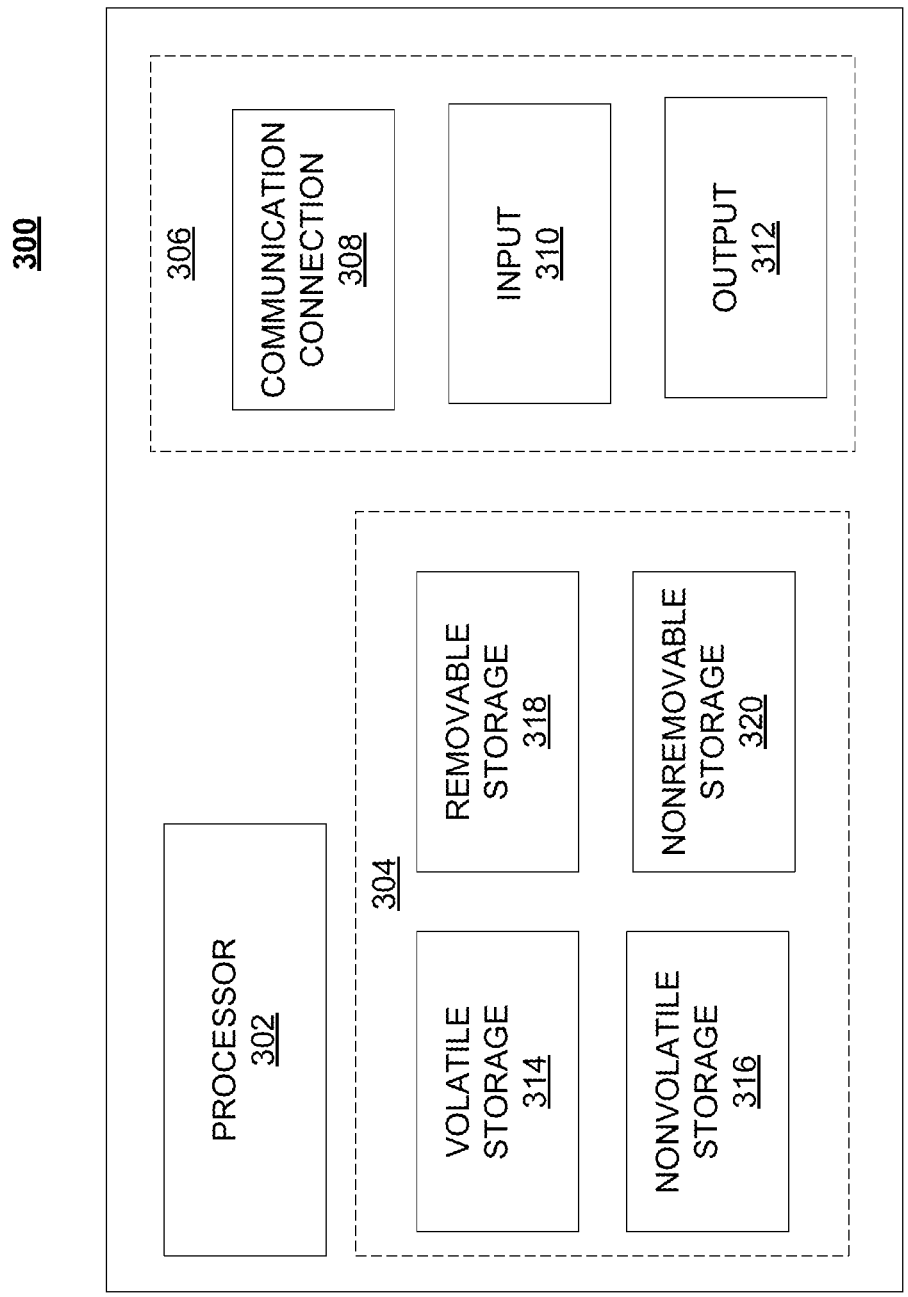

MINIATURIZED NETWORK NODES

CROSS-REFERENCE TO RELATED APPLICATION

This application claims priority to, and is a continuation-in-part of, U.S. patent application Ser. No. 16/416,680, filed May 20, 2019 and entitled "Edge-Node Authentication for Functions as a Service." U.S. patent application Ser. No. 16/416,680 is incorporated herein by reference in its entirety.

BACKGROUND

Applications built for serverless architectures may contain dozens—or even hundreds—of serverless functions, each with a specific purpose. These functions may connect together to form overall system logic. These functions may be spun up and changed every few milliseconds to account for demand. Costs are associated with ramping up and maintaining such functions. Inefficiencies may arise when demand is unusually low, as multiple nodes may still need to be spun up for different functions used to perform the requested service, but the bandwidth capabilities of such nodes may not be used.

Thus, there is a need to develop authentication technology that can reduce the risk of unnecessary network costs associated with low demand and off-peak usage.

SUMMARY

The disclosed systems, methods, and apparatuses allow for authentication to facilitate development and use of virtualized environments, serverless architectures, and functions as a service ("FaaS").

In an aspect, this disclosure is directed to a method. The method may parsing code of a first network node to identify a first function and tracing a route to determine connectivity between the first network node and a second network node. The method may include parsing code of the second network node to identify a second function. The method may also include creating a miniaturized network node based on the first and second function components. The method may include receiving a request to access a microservice that utilizes the first network node and the second network node and routing the request to the miniaturized network node based on a characteristic of the request. The miniaturized network node may operate to provide at least a subset of functionality of the microservice responsive to the request.

In another aspect, this disclosure is directed to a method. The method may include receiving a request to access a microservice that utilizes a first function and a second function. The method may also include evaluating an availability of resources effectuating the first and second functions and identifying a miniaturized network node that provides a subset of functionality of the first and second functions. The method includes, based on the availability, routing the request to the miniaturized network node. The miniaturized network node may operate to provide at least a subset of functionality of the microservice responsive to the request.

According to another aspect, this disclosure is directed to a system. The system may include a processor and memory storing executable instructions that cause the processor to effectuate operations. The operations may include parsing code of a first network node to identify a first function and tracing a route to determine connectivity between the first network node and a second network node. The operations may include parsing code of the second network node to identify a second function. The operations may also include creating a miniaturized network node based on the first and second function components. The operations may include receiving a request to access a microservice that utilizes the first network node and the second network node and routing the request to the miniaturized network node based on a characteristic of the request. The miniaturized network node may operate to provide at least a subset of functionality of the microservice responsive to the request.

BRIEF DESCRIPTION OF THE DRAWINGS

Aspects of the herein authentication technology are described more fully herein with reference to the accompanying drawings, in which example embodiments are shown. In the following description, for purposes of explanation, numerous specific details are set forth in order to provide an understanding of the various embodiments. However, the instant disclosure may be embodied in many different forms and should not be construed as limited to the example embodiments set forth herein. Where convenient, like numbers refer to like elements.

FIG. 3 is a schematic of an exemplary device that may be a component of the system of FIG. 1.

DETAILED DESCRIPTION

Serverless architectures and, more specifically, FaaS architectures, are designed to dynamically respond to changes in demand for FaaS. However, they are designed to respond to large scale demand and are not optimized for handling very small changes in demand. Network nodes dedicated to different FaaS are optimized by providing a specific function for a large amount of traffic. For example, to provide an online shopping microservice, the network may provide multiple related but distinct functions, like inventory display, shopping cart, payment, and final order, as separate nodes. In this way, each node can optimize the provision of its specific function and provide it on a large scale. In contrast, when network demand is incredibly low (e.g., off-peak hours), provision of a microservice still may involve ramping up multiple network nodes, even though the low demand means that the network nodes are being used for only a small fraction of their available bandwidth. While division of functions of a microservice across multiple nodes works well for regular network demand, using the same approach during off-peak hours leads to inefficiencies.

A miniaturized network node can provide all or some of the functionality (e.g., FaaS) of a microservice without the need to ramp up as many nodes as are normally involved. The decision of when and how to use a miniaturized network node, as opposed to multiple network nodes, to provide the same or similar functionality of a microservice may be responsive to the current demand on for the microservice to use the exchange or other factors. That is, the network can use miniaturized network nodes to respond to small-scale changes in demand for the microservice or the network in general.

Figure 1:
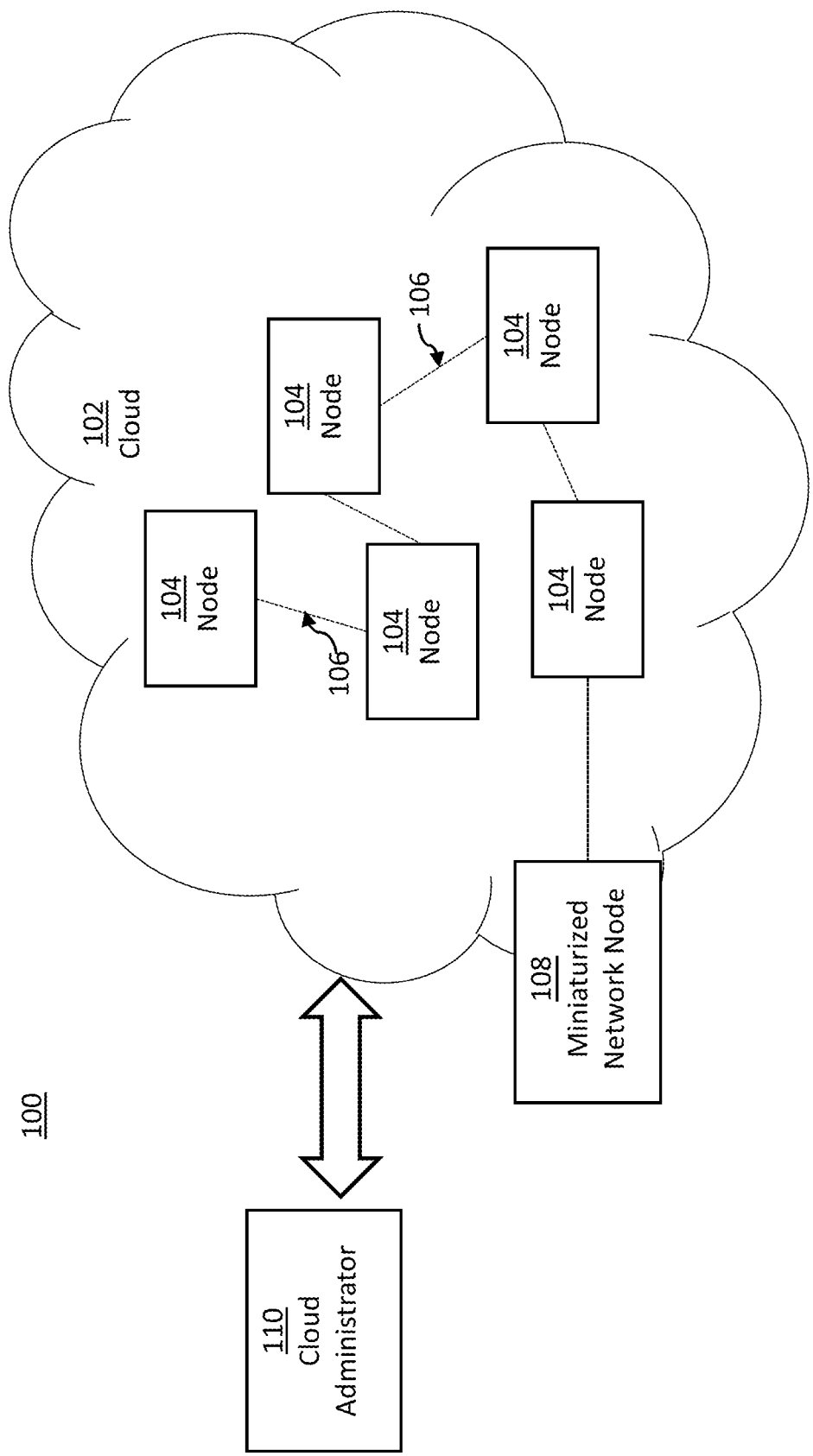
FIG. 1 is a schematic of a virtualized system for cloud computing in which miniaturized network nodes can be incorporated.

FIG. 1 is a high-level schematic of a system 100 in which FaaS can deployed. System 100 includes additional functionality for authentication procedures related to FaaS deployment and use. Generally, system 100 may include a cloud environment 102 in which nodes 104 may operate. Environment 102 may be a public or private cloud. Environment 102 may have a serverless architecture, in which server management and low-level infrastructure decisions are handled by a cloud administrator 106. Such models may simplify the tasks of developers in creating and operating applications by handling allocation of resources at the cloud level rather than at the application level.

Each node 104 may be a unit of software functionality. For example, node 104 may be a virtual machine. A virtual machine may be a software implementation of a machine (e.g., a computer) that execute programs or functionality like a physical machine. Virtual machines can be isolated software containers, operating independent of other virtual machines. Such isolation can assist in realizing virtual-machine-based virtual environments that can execute applications and provide services with availability, flexibility, and security, in some cases, surpassing those on traditional, non-virtualized systems. Virtual machines can encapsulate a complete set of virtual hardware resources, including an operating system and all its applications, inside a software package. Encapsulation can make virtual machines quite portable and manageable. Indeed, virtual machines can be hardware-independent, and can be portably provisioned and deployed on one of multiple different computing devices, operating systems, and environments. Indeed, depending on the availability of computing devices within a cloud environment (e.g., environment 102) a particular virtual machine may be provisioned on any one (or multiple) of the devices included in cloud environment 102.

Additionally or alternatively, node 104 may be a smaller software unit, such as a microservice, or, even smaller, a virtual function, such as an FaaS. The operations that node 104 may perform may be include one or more functions. These nodes 104 may be modular functions that can execute and scale independently within environment 102. Multiple FaaSes (e.g. nodes 104) may form a microservice. A microservice may operate as a service, such as one used by one or more applications. Multiple microservices may form an application. In FaaS models, nodes 104 may be more responsive to changes in demand, spinning up and destructing dynamically.

Serverless architecture, like that of system 100, allows for nodes 104, and pathways 106 between such nodes, to spin up in response to a request. For example, a shopping website may use four nodes 104: an inventory database, a pricing database, an ordering system, and a credit card processing system. In response to demand, nodes 104 for each of these functions may spin up, and pathways 106 may connect nodes 104 together. For example, an ordering system node 104 may communicate with a pricing database node 104 to obtain price information in response to a request to view or add-to-cart a product for sale based on information received from an inventory database node 104 and/or user input. A data transmission may enter these components of a shopping website through one or more of the aforementioned nodes 104, and interact with multiple nodes 104 along pathway 106. For example, the ordering system node 104 may pass along a component of the data transmission it received to a second node, like the pricing node 104, but may otherwise not evaluate that data transmission component. Thus, when that data transmission component reaches the second node 104, that second node 104 may determine that the data transmission component is unauthorized and the request to system 100 may be rejected.

System 100 may include a miniaturized network node 108 that includes a subset (or all) of the functionality of one or more nodes 104. For example, miniaturized network node 108 may include a subset of functionality of a first network node 104 and a subset of functionality of a second network node 104, where first and second network node 104 may operate together to provide a microservice. This may include miniaturized network node 108 including a replica of all the functionality of network node 104. Additionally or alternatively, this can include miniaturized network node 014 including a replica of a subset of the functionality of network node 104. For example, for a miniaturized network node 108 based on functionality of an inventory database network node 104, the subset of functionality may be a subsection of the inventory. In extremely low level traffic times, like 3 AM local time on Tuesday nights, past usage of a microservice using the inventory network node 104 may suggest that users are interested in viewing watches and necklaces and are particularly uninterested in viewing inventory for suiting or denim. Thus, a miniaturized network node 108 may limit the available inventory for viewing to accessories. If a request is made to view other inventory, the request may be forwarded to the network node 104, instead of utilizing miniaturized network node 108 to provide the microservice. In this manner, the functionality and role of miniaturized network node 108 in providing access to a microservice without the need to ramp up multiple network nodes 104 that each perform a step of a multistep microservice.

Miniaturized network node 108 may comprise an edge node that sits at the edge of cloud environment 102, so that it may require fewer (or no) network nodes 104 to relay the request to miniaturized network node 108. As miniaturized network nodes 108 are dynamically creatable and may be created in conjunction with or subsequent to the creation of nodes 104 comprising the microservice for which miniaturized network node 108 may replicate nodes 104 to provide the microservice on a small scale. Thus, the location of miniaturized network node 108 may be in proximity to other nodes 104 within cloud environment 102.

To perform a microservice (or service), pathways 106 may connect nodes 104 whose interaction facilitates performance of the service. For miniaturized network node 108 to identify the functions that facilitate performance of the service, pathways 106 between nodes 104 of a microservice may be traced to identify subsequent nodes 104 utilized by that microservice or service. In this manner, miniaturized network node 108 may gather the functionality or parameters for that microservice or service.

Figure 2A:
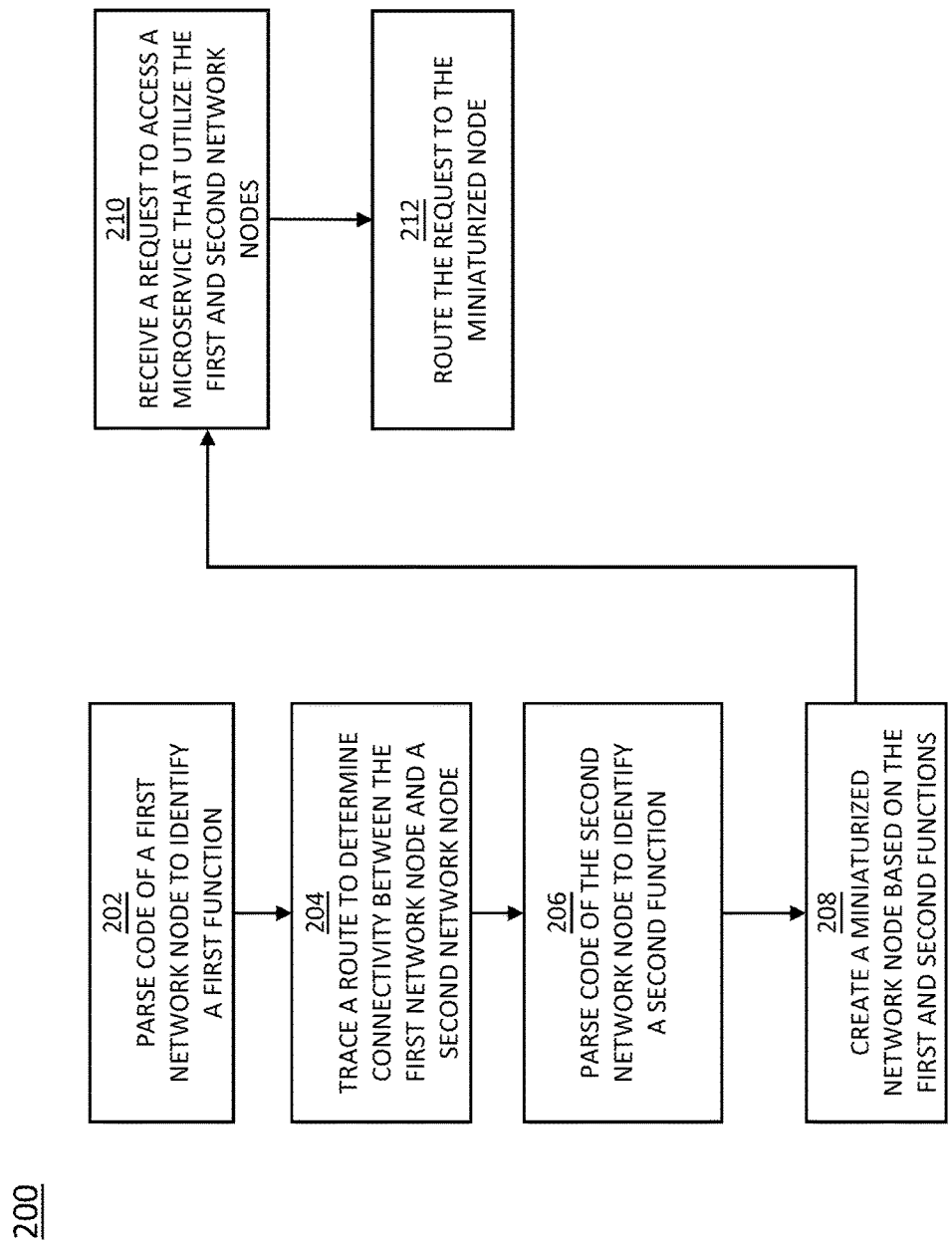
FIG. 2a is a flowchart of an exemplary method of creating and using a miniaturized network node.

FIG. 2a illustrates a method 200 by which miniaturized network node 108 functions. The steps of method 200 may be performed by network administrator 110. Additionally or alternatively, these steps may be performed miniaturized network node 108 or other components of cloud 102, or any combination thereof.

At step 202, method 200 may include parsing code of a first network node 104 to identify a first function. As discussed above, functions of network node 104 may be used to effectuate a service or microservice. First network node 104 may have one or many functions, and the first function may be selected based on its role in performing the microservice, the demand for certain uses of the microservice, and other factors. Additionally or alternatively, method 200 may include determining functions performed by network nodes 104 based on other means. For example, nodes 104 may be configured to respond to certain types of requests by indicating their functions, the frequency of using the functions, and other demographics related to historical use of functions.

At step 204, method 200 may include tracing a route to determine connectivity between the first network node 104 and a second network node 104. This functionality may be used to identify subsequent network nodes 104 that a request, first received by the first network node 104, would then attempt to access.

Once subsequent network nodes 104 are identified, at step 206, other functions may be identified. For example, code of second network node 104 may be parsed to identify a second function. This process may continue to identify all validation parameters that may ultimately be checked by nodes 104 when a request is provided a service that utilizes those nodes 104.

At step 208, a miniaturized network node 108 may be created based on the functions. In another instance, multiple miniaturized network nodes 108 may be created, such that they cooperate to provide the microservice that first and second network nodes 104 also provide.

At step 210, method 200 may include receiving a request to access a microservice that utilizes first and second network nodes 104. At step 212, the request is routed to the miniaturized network node. This could be based on different factors, as discussed above. For example, if using the first and second nodes 104 to perform the microservice would require ramping up new nodes 104 and, optionally, use of first and second nodes 104 would only be a small fraction of the capacity of first and second nodes 104, the request may be routed to miniaturized network node 108 instead. The decision to route may be based on other or different characteristics as discussed above, such as the demand for the microservice. For example, method 200 may include determining an available bandwidth of at least one of the first and second network nodes 104, and the decision to route to miniaturized network node 108 may be based on that available bandwidth. Miniaturized network node 108 may perform all, or at least a subset of, the functionality of the microservice responsive to the request.

Routing may also involve selecting between miniaturized network nodes 108. For example, two miniaturized network nodes 108 may be able to provide (a portion of) a microservice. Determining whether to route the request to the miniaturized network node 108 as opposed to a second miniaturized network node 108 may include determining an available bandwidth of each, and selecting one miniaturized network node 108 based on the available bandwidth.

Once miniaturized network node 108 receives the request, it may process the request by providing services based on the microservice and provide an outcome, such as responsive to the requesting entity. For example, if the microservice is requested to provide an available inventory of a shopping website, miniaturized network node 108 may contain all the functionality to complete that request. As another example, miniaturized network node 108 may process a portion of the microservice, but may need to pass on the outcome to another network node 104 of the microservice. For example, miniaturized network node 108 may be able to display broad categories of inventory, but if the requesting entity selects a more in-depth view of the shoes inventory, miniaturized network nodes 108 may pass the outcome (e.g., selection of the shoe inventory) to a third network node 104.

Figure 2B:
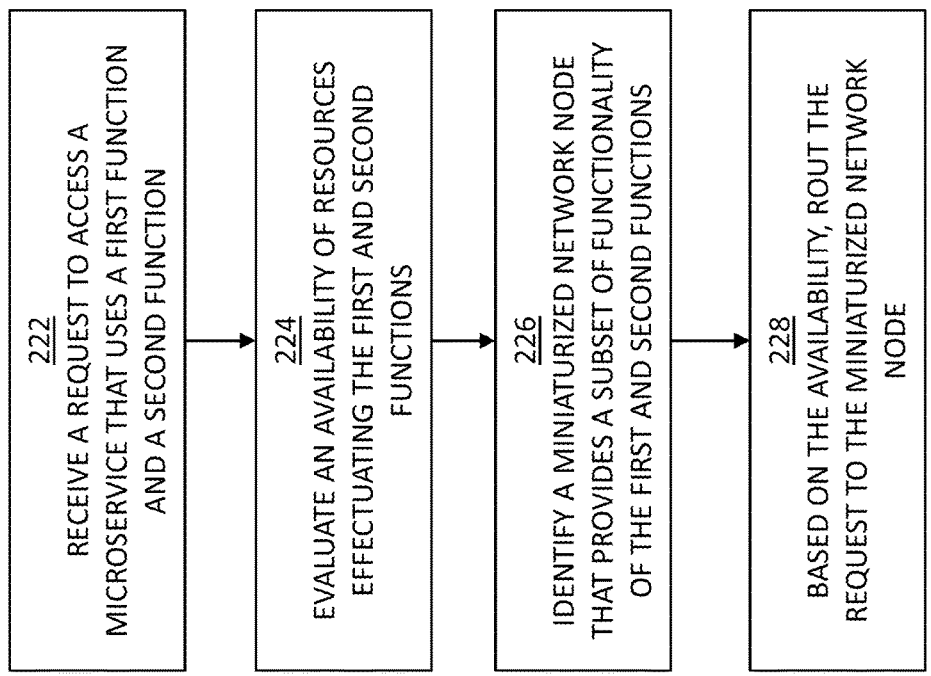
FIG. 2b is a flowchart of an exemplary method of using a miniaturized network node.

FIG. 2b illustrates a method 220 by which miniaturized network node 108 functions. The steps of method 220 may be performed by network administrator 110. Additionally or alternatively, these steps may be performed miniaturized network node 108 or other components of cloud 102, or any combination thereof.

At step 222, method 220 may include receiving a request to access a microservice that utilizes a first function and a second function. At step 224, method 220 may include evaluating an availability of resources effectuating the first and second functions. This may include, for example, identifying instantiations of a first network node 104 that performs the first function. This may also include, for example, identifying instantiations of a second network node 104 that performs the second function. Further, this may include determining an available bandwidth, or other resource, associated with the first and second functions. At step 226, method 200 may include identifying instantiations of miniaturized network node 108 that performs a subset of the functionality of both first and second functions. Based on the availability, at step 228, method 220 may route the request to miniaturized network node 108.

FIG. 3 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a networking environment, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications therebetween. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

What is claimed:

1. A method comprising:
   parsing code of a first network node to identify a first function;
   tracing a route to determine connectivity between the first network node and a second network node;
   parsing code of the second network node to identify a second function;
   creating a miniaturized network node based on the first and second function components;
   receiving a request to access a microservice that utilizes the first network node and the second network node; and
   routing the request to the miniaturized network node based on a characteristic of the request,
   wherein the miniaturized network node operates to provide at least a subset of functionality of the microservice responsive to the request.

2. The method of claim 1, wherein the miniaturized network node comprises an edge node.

3. The method of claim 1, wherein the characteristic of the request comprises a demand for the microservice.

4. The method of claim 1, further comprising:
   determining an available bandwidth of at least one of the first network node and the second network node,
   wherein routing the request to the miniaturized network node is further based on the available bandwidth.

5. The method of claim 1, wherein the miniaturized network node processes the request to provide an outcome.

6. The method of claim 5, wherein the miniaturized network node passes the outcome to a third network node of the microservice.

7. The method of claim 5, wherein the miniaturized network node passes the outcome to an entity requesting the request.

8. The method of claim 1, wherein the miniaturized network node comprises a replica of the first function and a replica of a portion of the second function.

9. The method of claim 1, further comprising:
   determining an available bandwidth of the miniaturized node and an available bandwidth of a second miniaturized node based on the first network node and the second network node,
   wherein routing the request to the miniaturized network node is further based on the available bandwidths of the miniaturized node and the second miniaturized node.

10. A method comprising:
    receiving a request to access a microservice that utilizes a first function and a second function;
    evaluating an availability of resources effectuating the first and second functions;
    identifying a miniaturized network node that provides a subset of functionality of the first and second functions; and
    based on the availability, routing the request to the miniaturized network node,
    wherein the miniaturized network node operates to provide at least a subset of functionality of the microservice responsive to the request.

11. The method of claim 10, wherein at least one of the first function and the second comprise a function as a service.

12. The method of claim 10, evaluating the availability comprises comparing an available bandwidth of at least one of the first and second functions and a predicted demand for the microservice.

13. The method of claim 10, wherein the miniaturized network node comprises a replica of the first function.

14. The method of claim 13, wherein the miniaturized network node comprises a replica of a subset of the second function.

15. The method of claim 11, wherein the miniaturized network node is further configured to create a second miniaturized network node based on the miniaturized network node.

16. A system comprising:
   a processor; and
   memory storing executable instructions that cause the processor to effectuate operations, the operations comprising:
   parsing code of a first network node to identify a first function;
   tracing a route to determine connectivity between the first network node and a second network node;
   parsing code of the second network node to identify a second function;
   creating a miniaturized network node based on the first and second function components;
   receiving a request to access a microservice that utilizes the first network node and the second network node; and
   routing the request to the miniaturized network node based on a characteristic of the request,
   wherein the miniaturized network node operates to provide at least a subset of functionality of the microservice responsive to the request.

17. The system of claim 16, wherein the miniaturized network node is a replica of functionality of the first network node and the second network node.

18. The system of claim 16, wherein the miniaturized network node is a replica of a subset of functionality of the first network node and the second network node.

19. The system of claim 16, wherein routing the request is further based on a demand for the microservice.

20. The system of claim 16 wherein the request is further based on an available bandwidth for the microservice.

* * * * *